US007483541B2

(12) United States Patent
Hagiwara

(10) Patent No.: US 7,483,541 B2
(45) Date of Patent: Jan. 27, 2009

(54) DIGITAL MIXER

(75) Inventor: Hideki Hagiwara, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 726 days.

(21) Appl. No.: 10/805,570

(22) Filed: Mar. 19, 2004

(65) Prior Publication Data

US 2004/0184626 A1 Sep. 23, 2004

(30) Foreign Application Priority Data

Mar. 20, 2003 (JP) ............................ 2003-077985

(51) Int. Cl.

| | |
|---|---|
| ***H04B 1/00*** | (2006.01) |
| ***G10H 1/00*** | (2006.01) |
| ***G10H 1/08*** | (2006.01) |
| ***G10H 7/00*** | (2006.01) |
| ***G10H 5/00*** | (2006.01) |
| ***G06F 17/00*** | (2006.01) |
| ***G06F 3/00*** | (2006.01) |
| ***G06F 3/16*** | (2006.01) |

(52) U.S. Cl. ......................... 381/119; 381/118; 700/94; 715/716; 715/727; 84/625; 84/660

(58) Field of Classification Search ................. 381/119, 381/118; 715/716, 727; 700/94; 84/625, 84/660; 345/440, 440.1

See application file for complete search history.

(56) References Cited

U.S. PATENT DOCUMENTS

2003/0059066 A1 3/2003 Kohyama et al.

2003/0144997 A1* 7/2003 Hugley .......................... 707/3

FOREIGN PATENT DOCUMENTS

| | | |
|---|---|---|
| JP | 07297651 | 11/1995 |
| JP | 2002-142286 | 5/2002 |
| JP | 2003-102098 | 4/2003 |
| WO | WO99/37046 | 7/1999 |

OTHER PUBLICATIONS

Roland Corporation, VS-1680 Owner's Manual, 1998.*

"Yamaha 01V Digital Mixing Console, Owner's Manual" by Yamaha Corporation, copyright 1998 by Yamaha Corporation, 305 pages.

(Continued)

*Primary Examiner*—Vivian Chin
*Assistant Examiner*—Douglas J Suthers
(74) *Attorney, Agent, or Firm*—Morrison & Foerster LLP

(57) ABSTRACT

In a digital mixer including a display, cursor controls, an increase/decrease control, and a plurality of channel strips for controlling parameters of input channels associated therewith, on a control panel, the channel strips each having a selection switch, an assignment switch is provided for assigning any one parameter among the parameters of the input channel to the increase/decrease control, so that where operation of the increase/decrease control is detected, when no selection switch has been operated, a value of a parameter displayed at the position of the cursor is changed in accordance with the operation of the increase/decrease control, while when any selection switch has been operated, a value of a parameter assigned to the increase/decrease control among parameters of an input channel corresponding to a channel strip having the selection switch is changed.

8 Claims, 10 Drawing Sheets

OTHER PUBLICATIONS

TASCAM: Teac Professional Division: "TASCAM DM-24 Digital Mixing Console" Online! Feb. 21, 2002, XP002296051 Retrieved from the Internet: URL:http://web.archive.org/web/20020221004457/http://www.tascam.de/en/docs/DM-24__Manual.pdf> 'retrieved on Sep. 9, 2004! *p. 10 *p.14-p. 19* *p. 30-p. 35* * p. 58 *.

Behringer: "Operating Manual DDX3216 Version 1.1" 'Online! Nov. 2001, XP002296052 Retrieved from the Internet: URL:http//www.behringer-download.com/DDX3216/DDX3216__ENG__Rev__B.pdf> 'retrieved on Sep. 13, 2004! *p. 10, column 1, paragraph 3 * * p. 15 * * p. 17, columns 1-2 *.

* cited by examiner

DIGITAL MIXER

BACKGROUND OF THE INVENTION

1. Field of the Invention

The invention relates to a digital mixer which processes audio signals and, more specifically, to a digital mixer which has characteristics in operability.

2. Description of the Related Art

A digital mixer which processes audio signals generally has many input channels and output channels. For each of them, many parameters of a limiter, compressor, equalizer, fader, pan, patch status, ON, and the like can be set, and conversely, it is necessary to set these many parameters in order to make the digital mixer perform action as desired.

As a control panel for performing such settings, for example, one shown in FIG. 12 has been used. This control panel 200 and setting processing of parameters using such a control panel 200 will be described here.

This control panel 200 includes a display 10 and is for instructing a change of parameters so as to edit the parameters by controlling various controls while referring to a view displayed on the display 10.

Therefore, as the controls, there provided are view selection switches 20, tab selection switches 30, cursor controls 40, increase/decrease controls 50, and an enter switch 60.

Views to be displayed on the display 10 include an input channel setting view for editing some parameters of one selected input channel, an output channel setting view for editing some parameters of one selected output channel, a parameter setting view for performing an edit of one parameter for a plurality of input channels at once, a setting view of input patch and output patch, and so on. The view selection switches 20 are switches for selecting these views. Besides, change of the kind of parameters to be displayed on the input channel setting view, or the like, is made by the tab selection switches 30.

Besides, the cursor controls 40 are controls for operating a cursor displayed in the above-described views. Further, the increase/decrease controls 50 are controls for increasing and decreasing the parameter displayed at the position of the cursor in the views. The increase/decrease controls 50 are composed of a rotary encoder 51 and an increase switch 52 and decrease switch 53, either of which can be used to instruct to increase and decrease. Then, by pressing the enter switch 60 after the increase/decrease setting, the value after the change can be enabled. However, as for continuously changeable parameters, the value after a change is enabled every time increase/decrease instruction is made.

The edit of parameters can be performed by selecting parameters desired to be changed one by one by each of these controls and instructing to make a change.

Further, in addition to the above, channel controls 70 composed of n pieces (n is arbitrary) of channel strips 71 to 7*n* are provided as controls for setting individual parameters. With each of the channel strips 71 to 7*n*, one input channel or output channel can be associated, so that they function as controls for setting parameters for the respective channels.

The channel strips 71 to 7*n* include moving faders 71*a* to 7*n*a for performing setting of the output level, ON switches 71*b* to 7*nb* for performing setting of ON/OFF, and selection switches 71*c* to 7*nc* having a later-described function (hereinafter, reference numbers 70*a*, 70*b*, and 70*c* will be used when showing the kind of switches, respectively), so that these controls can be used to directly set parameters associated therewith. If there is no problem in terms of cost or space, controls and rotary encoders associated with other parameters may be further provided.

Besides, the control panel 200 includes a selected channel control switch group 80. The selected channel control switch group 80 is composed of rotary encoders and switches associated with several parameters. By pressing a certain selection switch 7*ic* among the above-described channel controls 70, a channel associated with a channel strip 7*i* including the selection switch can be assigned to the selected channel control switch group 80, whereby the rotary encoders and switches constituting the selected channel control switch group 80 can be used as controls for setting associated parameters for the channel.

The control panel 200 provided with the above-described controls can be used to set many parameters necessary to make the digital mixer operate. In particular, when the controls in the selected channel control switch group 80 are used, parameters desired to be set can be changed without moving the cursor, leading to high operability.

We have before filed a patent on a technique relating to such a control panel 200 (U.S. Patent Application Publication 2003/0059066, unpublished on the priority date of this application).

Besides, JP, 2002-142286, A is known as a technical document in the related field.

However, since provision of the switches of the selected channel control switch group 80 in the above-described control panel 200 leads to an increase in cost, a sufficient number of switches cannot be provided in a less expensive lower grade model, or no switches can be provided at all in some cases. Further, also in an expensive higher grade model, it is difficult to provide switches for all of the parameters.

Accordingly, for a parameter that has no associated switch in the selected channel control switch group 80, it has been required to operate the view setting controls such as the view selection switches 20, tab selection switches 30, and cursor controls 40 to display the setting view of the parameter on the display 10, adjust the cursor to the parameter, and then change the value thereof. Therefore, there has been a problem that many operations are required to change the value, resulting in poor operability.

SUMMARY OF THE INVENTION

The above problem is remedied by making changeable parameters associated with the respective switches in the selected channel control switch group 80, but the selected channel control switch group 80 is a switch group provided for setting particular parameters, and there is also a demand that the functions of these switches are fixed for better usability.

Besides, provision of a rotary encoder for every channel strip is also conceivable, but the provision further increases cost, and the provision of only one rotary encoder allows only one parameter to be assigned at one time, resulting in not so good solution of the above-described problem.

It is an object of the invention to solve such a problem and improve the operability in a digital mixer with reduced cost.

To attain the above object, the invention is a digital mixer including a display, cursor controls, an increase/decrease control, and a plurality of channel strips for controlling parameters of input channels associated therewith, on a control panel, the channel strips each having a level setting control and a selection switch, the digital mixer including: a view selector for selecting a view to be displayed on the display; a level controller for detecting operation of the level setting control of the channel strip and controlling an input signal level for an input channel corresponding to the operated channel strip; a channel selector for detecting operation of the selection switch of the channel strip and bringing parameters of an input channel corresponding to the operated channel strip into an editable state on the view; an assignor for assigning any one parameter among the parameters of the input channel to the increase/decrease control; a cursor controller for detecting operation of the cursor control and controlling a position of a cursor on the view; and a parameter controller for detecting operation of the increase/decrease control, judging, when the operation is detected, whether or not the selection switch of any of the channel strips has been operated, and when judging that no selection switch has been operated, changing a value of a parameter displayed at the position of the cursor in accordance with the operation of the increase/decrease control, while when judging that any selection switch has been operated, changing a value of a parameter assigned to the increase/decrease control by the assignor among parameters of an input channel corresponding to a channel strip having the operated selection switch in accordance with the operation of the increase/decrease control.

In such a digital mixer, it is preferable that the increase/decrease control is a rotary encoder and/or an increase switch and a decrease switch.

Further, it is preferable to provide a display controller for displaying the value of the parameter assigned to the increase/decrease control on the view. Furthermore, it is preferable that the display controller displays the value of the parameter assigned to the increase/decrease control as an overlap view on the view in display. Moreover, it is preferable that the display controller displays the overlap view on the view for a predetermined period and then erases the overlap view from the view.

Alternatively it is preferable that the view selector selects a view to be displayed on the display in accordance with operation of predetermined view selection controls.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, preferred embodiments of the invention will be described with reference to the drawings.

Figure 2:
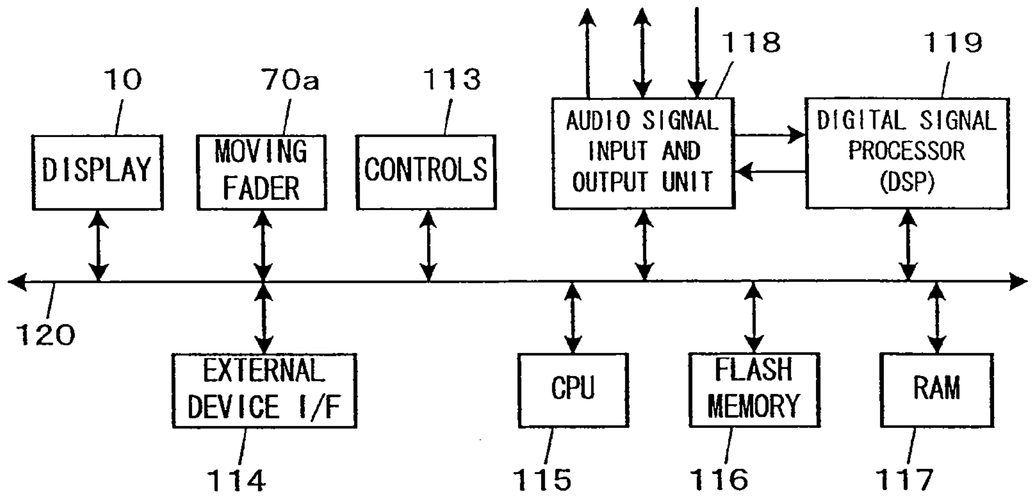
FIG. 2 is a block diagram showing a schematic configuration of the whole digital mixer.
Figure 3:
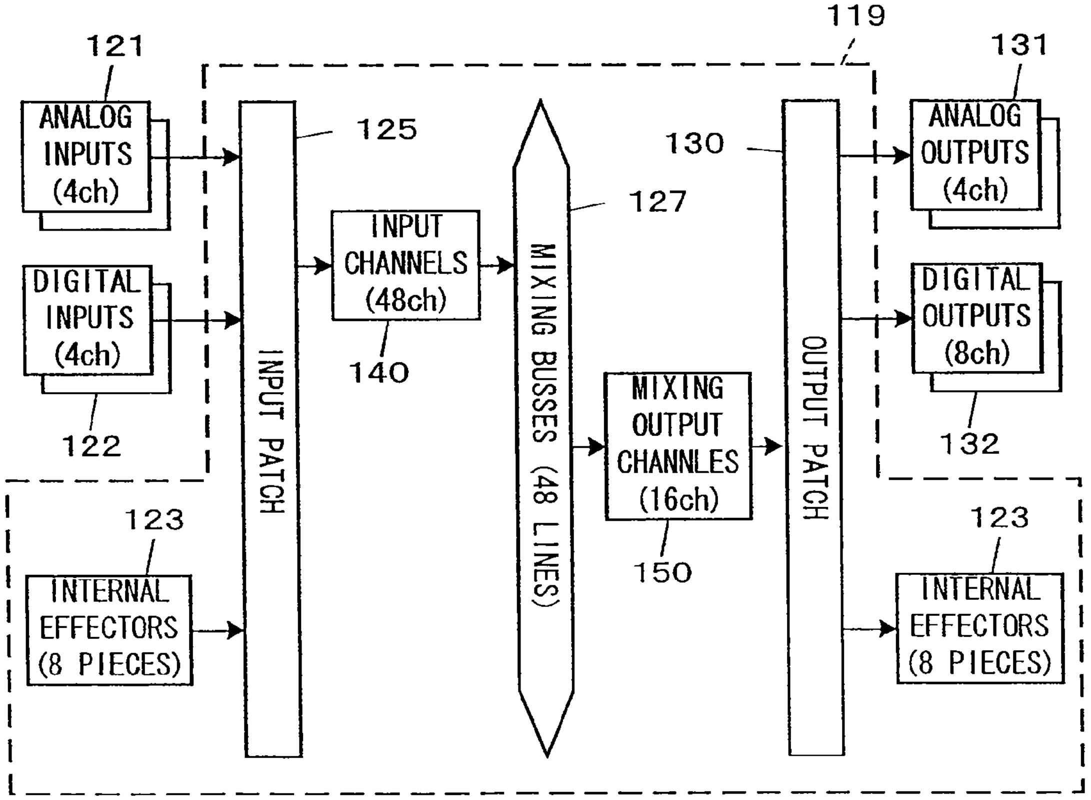
FIG. 3 is a block diagram showing in more detail the configuration of a DSP shown in FIG. 2.

A configuration of an embodiment of a digital mixer according to the invention will be described first using FIG. 2 and FIG. 3. FIG. 2 is a block diagram showing a schematic configuration of the digital mixer, and FIG. 3 is a block diagram showing the configuration of a DSP shown in FIG. 2 in more detail.

The digital mixer (hereafter, also referred to simply as a "mixer") is an audio signal processing device which performs various kinds of processing such as mixing, equalizing, and so on for inputted audio signals in accordance with setting data and outputs the audio signals, having, as shown in FIG. 2, a display 10, moving faders 70*a*, controls 113, an external device interface (I/F) 114, a CPU 115, a flash memory 116, a RAM 117, an audio signal input and output unit 118, and a digital signal processor (DSP) 119, which are connected by a system bus 120.

The display 10, which is a display means composed of a liquid crystal display (LCD) or the like, is for displaying a view for referring to, changing, saving, and so on settings of the mixer, the operating status of the device, and soon.

The moving faders 70*a* and controls 113 are provided on a control panel 100 of the mixer for a user to set parameters in processing of audio signals. Among them, the moving faders 70*a* have a motor to be movable to designated positions also by an instruction from the CPU 115.

The external device I/F 114 is an interface for sending/receiving information to/from external devices such as a personal computer and the like connected to the mixer.

The CPU 115, which is a control unit that comprehensively controls action of the whole mixer, executes a predetermined program stored in the flash memory 116 to detect operations of the moving faders 70*a* and controls 113 and take actions in accordance with the operations, and to control the action of the DSP 119, the display contents of the display 10, the positions of the moving faders 70*a*, and so on in accordance with setting data.

The flash memory 116 is a rewritable non-volatile memory that stores a control program executed by the CPU 115, and so on.

The RAM 117 is a memory that stores temporarily necessary data such as setting data of the mixer and is used as a work memory of the CPU 115.

The audio signal input and output unit 118 is an interface for receiving input of audio signals to be processed in the DSP 119 and outputting the processed audio signals. A plurality of A/D conversion boards, D/A conversion boards, and digital input and output boards can be installed in combination into the audio signal input and output unit 118, which actually inputs and outputs signals through the boards.

The DSP 119 includes, for executing mixing processing, as shown in FIG. 3, internal effectors 123, an input patch 125, input channels 140, mixing busses 127, mixing output channels 150, and an output patch 130. Analog inputs 121, digital inputs 122, analog outputs 131, and digital outputs 132 represent input and output channels implemented by the above-described boards to be installed in the audio signal input and output unit 118.

The internal effectors 123 are composed of plural blocks of effectors that apply selected effects to inputted signals and output the signals. The channel configuration of the internal effector 123 is changeable between monaural, stereo, and so on.

The input patch 125 performs optional patch for assigning to the input channels 140, having 48 channels, signals inputted from the inputs of the analog inputs 121 and digital inputs 122, and the internal effectors 123. A user can perform the setting of the patch while watching a predetermined view, so that input signals assigned by the input patch 125 are inputted into respective input channels 140.

Each of the input channels 140 includes, the illustration being omitted, functions such as de-emphasis, high-pass filter, 4-band parametric equalizer (PEQ), noise gate, compressor, delay, fader, ON, pan, send level adjustment, mute, and so on. These elements may be realized by circuits or by arithmetic processing.

In the input channel 140, these elements perform predetermined processings for inputted signals and output the processed signals to a mixing bus that is set as an output destination by setting data among the mixing busses 127 having 16 busses. In this event, it is possible to output the signal from one input channel 140 to plural mixing busses 127, and also to output the signals from plural input channels 140 to one mixing bus 127.

The signal inputted to the mixing bus 127 is outputted to a corresponding mixing output channel 150. In this event, a mixing bus 127 into which signals are inputted from plural input channels 140 performs mixing processing for the signals.

Sixteen mixing output channels 150 are provided to correspond to the mixing busses 127 on a one-to-one basis. Each of the channels includes, the illustration being omitted, a 6-band PEQ, a compressor, a delay, and a fader.

In the mixing output channel 150, these elements perform predetermined processings for inputted signals and output the processed signals to the output patch 130.

The output patch 130 performs optional patch of assigning the signals inputted from the mixing output channels 150 to outputs of the analog outputs 131 and digital outputs 132, and the internal effectors 123. The user can perform also the setting of the output patch 130 while watching a predetermined view, and the signal from one output channel can be assigned even to plural outputs. The signals assigned to the analog outputs 131 or digital outputs 132 are outputted therefrom, and the signals assigned to the internal effectors 123 are processed therein and then inputted again into the input patch 125.

The DSP 119 shown in FIG. 2 has the above-described configuration to perform processings such as mixing, equalizing, and so on for inputted audio signals. The DSP 119 can also mix signals selected from the input channels 140 and the mixing output channels 150 and output the mixed signal to a monitor output.

It should be noted that in FIG. 3, inputs such as an input on the console side and a talk back-in, outputs such as an output on the console side and a cue out, a connection for an insert effect, and a connection for a monitor output, are omitted for simplification of the drawing.

Figure 1:
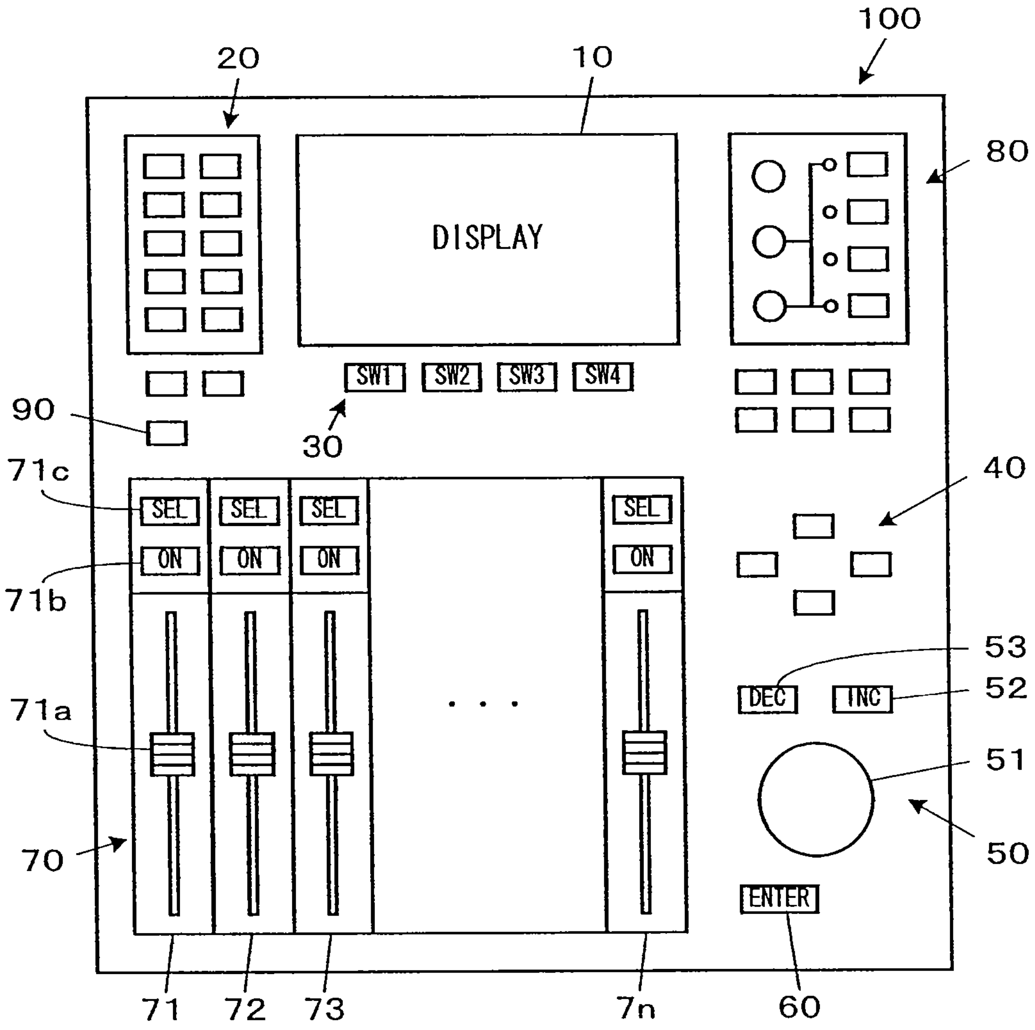
FIG. 1 is a view showing a schematic configuration of a control panel of a digital mixer being an embodiment of the invention.

A configuration of the control panel of the digital mixer will be described next using FIG. 1. FIG. 1 is a view showing the schematic configuration of the control panel of the digital mixer.

Figure 12:
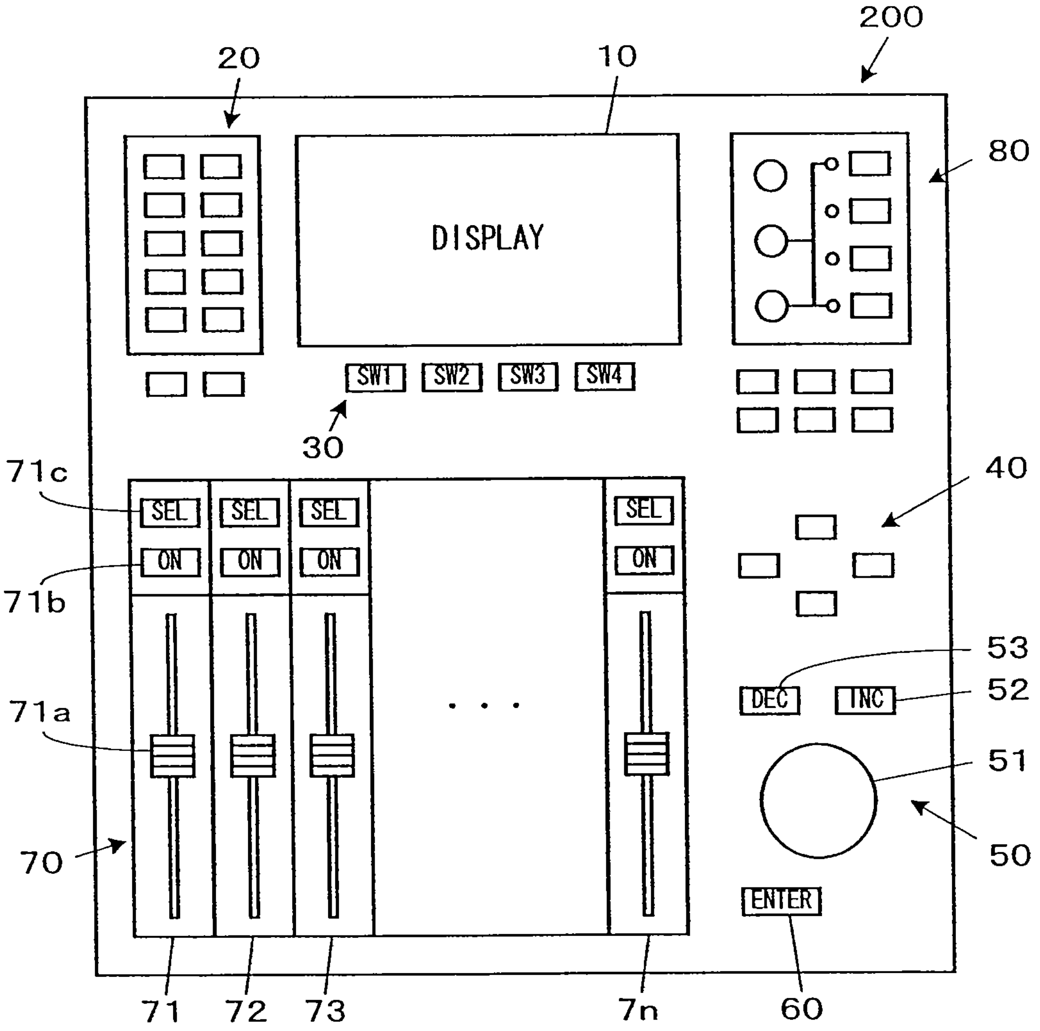
F I G. 1 2 PRIOR ART
FIG. 12 is a view showing a schematic configuration of a control panel of a conventional digital mixer.

This control panel 100 has almost the same configuration as that of the conventional control panel 200 shown in FIG. 12. Specifically, the control panel 100 is the same as the conventional control panel 200 except that an assignment switch 90 is newly provided. Therefore, the overlapping description will be omitted.

It should be noted that all the processing relating to display and change of parameters by the operation of the controls, which has been described in the section of the related art, is realized by the CPU 115 detecting the operation of the controls and performing processing in accordance with the contents of the operation. For example, when a view to be displayed on a display 10 is selected by operation of view selection switches 20 and tab selection switches 30, the CPU 115 performs display processing in response to the operation, in which the switches and the CPU 115 function as a view selector.

Further, a plurality of moving faders 70*a* (71*a*, 72*a* . . . , 7*na*) are level controls, and when any one of the moving faders 70*a* is operated, the CPU 115 detects the operation and changes and controls in accordance with the operation the input signal level for an input channel corresponding to a channel strip having an operated moving fader 7*ia*. In this case, the CPU 115 functions as a level controller.

When the position of a cursor in the view of the display 10 is moved in accordance with the operation of cursor controls 40, the CPU 115 functions as a cursor controller.

When a selection switch 7*ic* of a certain channel strip 7*i* is operated while an input channel setting view is displayed on the display 10, parameters of an input channel assigned to the certain channel strip 7*i* are displayed, so that the parameters of the input channel become objects to be edited on the input channel setting view. In this case, the CPU 115 functions as a channel selector.

When the selection switch 7*ic* of the certain channel strip 7*i* is operated while a parameter setting view is displayed on the display 10, the cursor on the view in display moves to the parameter of the input channel assigned to the channel strip 7*i* corresponding to the selection switch 7*ic*, so that the parameter becomes changeable by increase/decrease controls 50.

Figure 4:
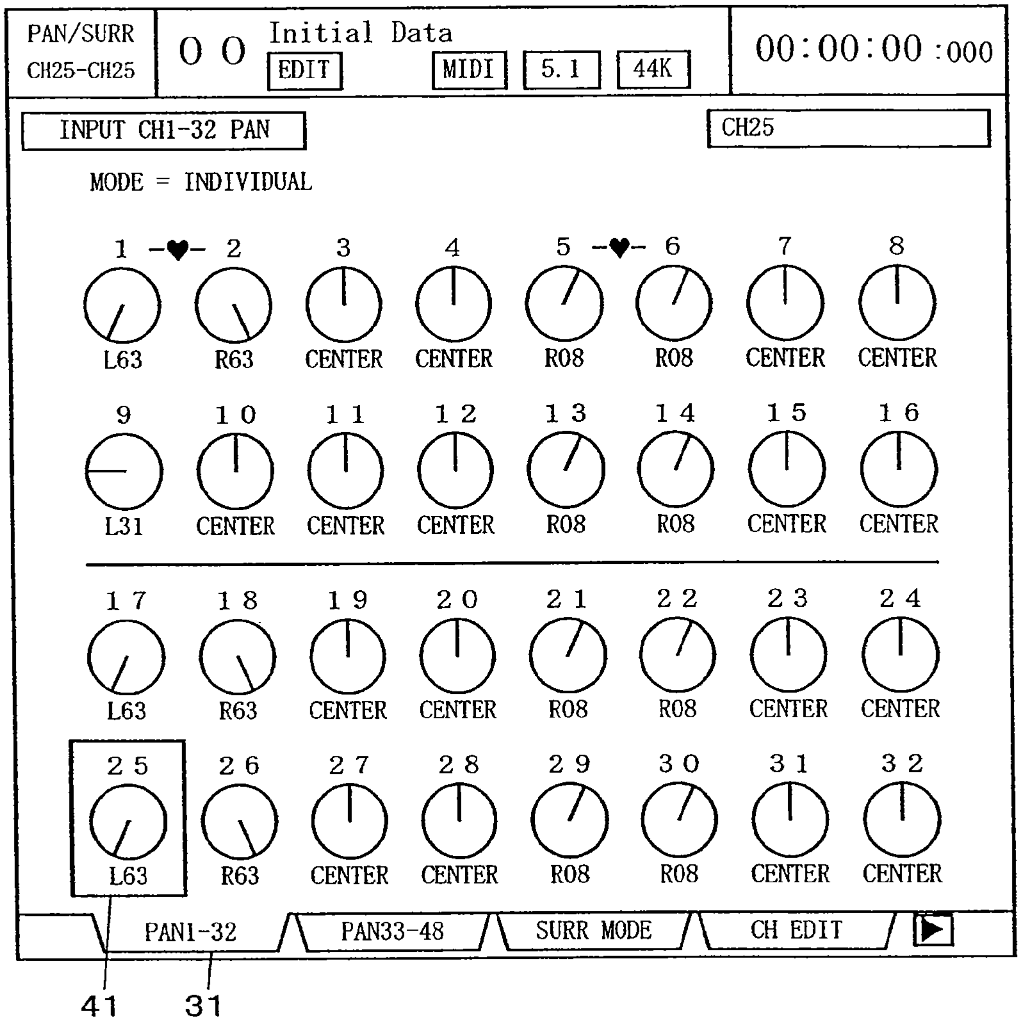
FIG. 4 is a view showing a display example of a parameter setting view.

Display examples of these views are shown. FIG. 4 is a view showing a display example of the parameter setting view, FIG. 5 is a view showing a display example of the input channel setting view, and FIG. 6A to FIG. 6C are views each showing a display example of an overlap view.

The parameter setting view shown in FIG. 4 is a view for performing an edit of one parameter for a plurality of input channels at once, and an example is shown here in which setting of pan is performed for 1st channel to 32nd channel of the input channels. By moving a cursor 41 to a channel for which setting is desired by means of the cursor controls 40 and operating the increase/decrease controls 50, pan for the channel on which the cursor 41 is positioned can be changed. Further, one of tabs 31 at a lower end is selected using the tab selection switches 30, whereby the parameter setting view for setting other input channels or other parameters can be displayed.

Figure 5:
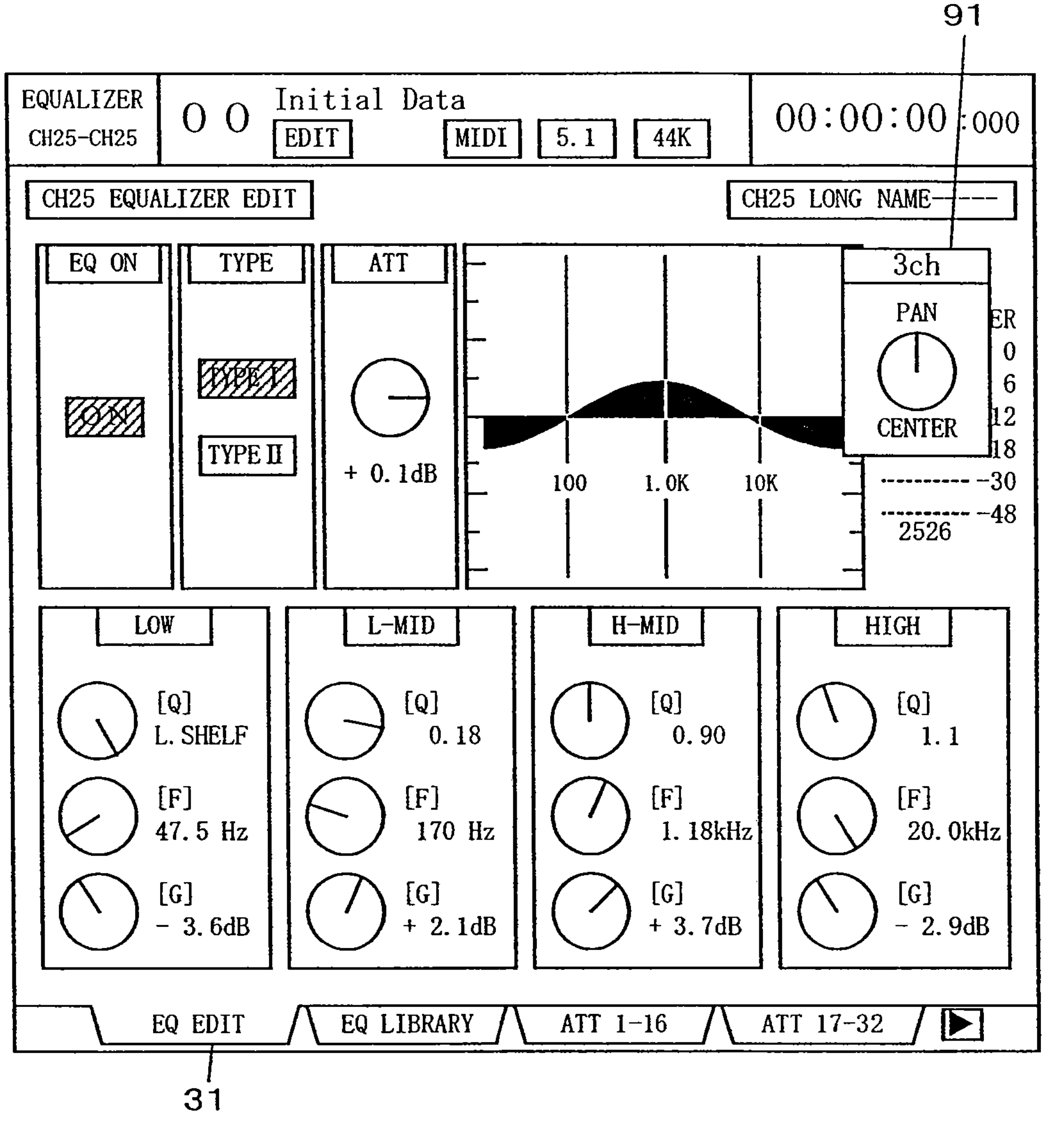
FIG. 5 is a view showing a display example of an input channel setting view.
Figure 6A:
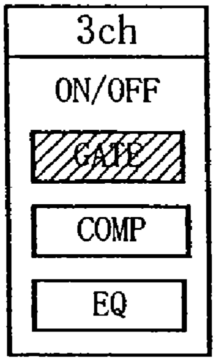
FIGS. 6A to 6C are views each showing a display example of an overlap view.
Figure 6B:
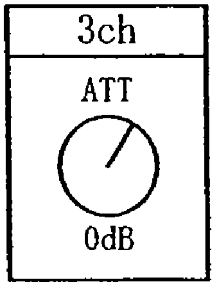
Figure 6C:
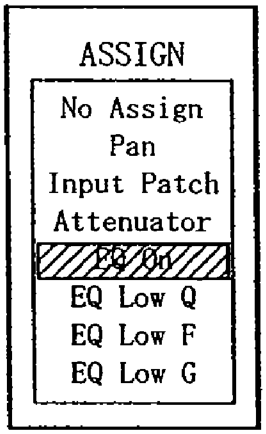

The input channel setting view shown in FIG. 5 can be displayed by pressing the view selection switches 20. This view is a view for editing some parameters of one selected input channel, and an example of a view is shown here in which setting on the equalizer of a 25th input channel is made. Although not shown in the view example, the cursor is moved here to a parameter for which setting is desired and the increase/decrease controls 50 are operated, whereby the value of the parameter on which the cursor is positioned can be changed.

Further, FIG. 5 shows an example in which an overlap view 91 is displayed, and the overlap view 91 is to be displayed when it is required to temporarily display a parameter that is not displayed on the current view and can be displayed, for example, as a pop-up window. The example shown in FIG. 5 shows the setting of pan on a third input channel. As display of the overlap view 91, in addition to the above, for example, those shown in FIG. 6A to FIG. 6C can be considered.

FIG. 6A is an overlap view for making a change between ON and OFF of the noise gate, compressor, and equalizer. In this view, a box with hatchings represents an ON state and a box without hatchings represent an OFF state.

FIG. 6B is an overlap view showing a control of an attenuator. When a rotary encoder to which the function of the attenuator is assigned is operated, display of the control is changed such that a marker is rotated in accordance with the manipulation degree of the rotary encoder also on the overlap view.

FIG. 6C is an overlap view showing an assignment state of a parameter to the increase/decrease controls 50 by the assignment switch 90 as described below. In this view, the parameter assigned to the increase/decrease controls 50 is displayed with hatchings, and a state in which the parameter of the equalizer On is assigned is shown in FIG. 6C. Then, by operating the increase/decrease controls 50, the kind of the assigned parameter to be assigned can be changed.

Here, the assignment switch 90 that is a characteristic of the control panel 100 is described. The embodiment is characterized in that any one of parameters among parameters of the input channels is assigned also to the increase/decrease controls 50 so that when the increase/decrease controls 50 are operated with the certain selection switch 7*ic* operated, the parameter assigned to the increase/decrease controls 50 among parameters of the channel strip 7*i* having the selection switch 7*ic* can be increased or decreased, while the function of changing the value of the parameter displayed at the position of the cursor is kept remained as in the prior art.

The assignment switch 90 is a switch for performing the assignment, and when the increase/decrease controls 50 are operated with the assignment switch 90 pressed, the kind of the parameter to be assigned to the increase/decrease controls 50 can be changed in sequence in accordance with the manipulation degree. As a matter of course, this processing is also performed by the CPU 115, and in this case the assignment switch 90, increase/decrease controls 50, and CPU 115 function as an assignor. It should be noted that in the processing relating to the above-described characteristic of the embodiment, the CPU functions as a parameter controller.

Next, processing relating to the characteristic of the embodiment in such a digital mixer will be described in more detail. This processing includes processing corresponding to several events so that when detecting a predetermined event, the CPU 115 executes processing corresponding thereto.

Figure 7:
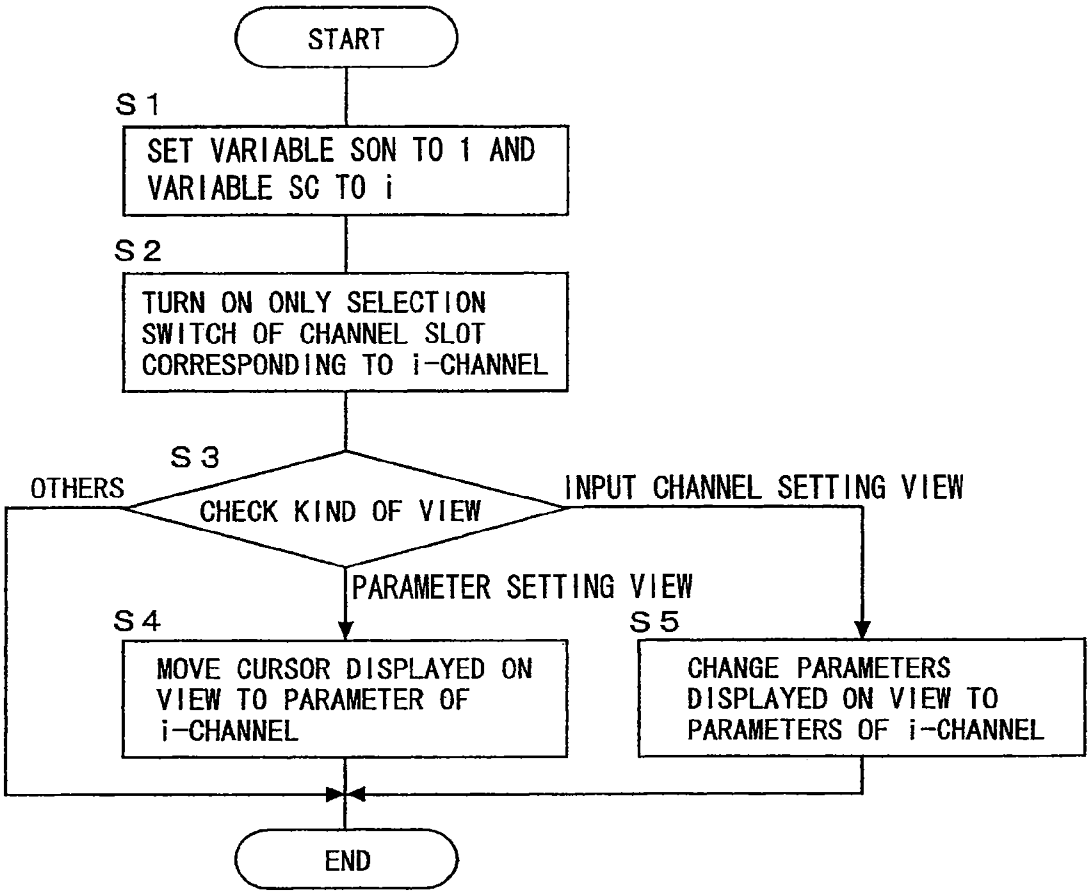
FIG. 7 is a flowchart showing processing executed by a CPU of the digital mixer shown in FIG. 2 corresponding to an ON event of a selection switch of a channel strip corresponding to an i-th input channel.

First, the processing shown in FIG. 7 is processing corresponding to an ON event of the selection switch 7*ic* of the channel strip corresponding to an i-th input channel.

In this processing, the value of a variable is set in Step S1. SON is a flag that is set to "1 (one)" when any of the selection switches 70*c* is ON, and SC is a variable showing the number of the input channel in selection by the selection switch 70*c*.

Next, a light emitter of the selection switch 7*ic* pressed is turned on in Step S2. Each of the selection switches 70*c* includes a light emitter implemented by a light emitting diode (LED) or the like and is configured to be able to show the user the ON/OFF state of the switch by the light emitter. As shown by heart marks in FIG. 4, paring two input channels is also performed, but only one of input channels can be selected at the same time also in this case. However, when one of the pair is selected, it is preferable that the light emitter of the other is made to blink to show the selection.

Next, the kind of the view displayed on the display 10 is checked in Step S3, and when it is the parameter setting view, the cursor 41 is moved to the parameter of the i-channel corresponding to the turned on selection switch 7*ic* in Step S4. If there is a need to change between the tabs 31, the change is also performed. In the case of the input channel setting view in Step S3, the view is changed to a view for editing the parameters of the i-channel in Step S5, and display contents are also changed to the parameters of the i-channel. In the case of other views, for example, a setting view for MIDI, time code, or the like, the processing is ended without changing the display.

Figure 8:
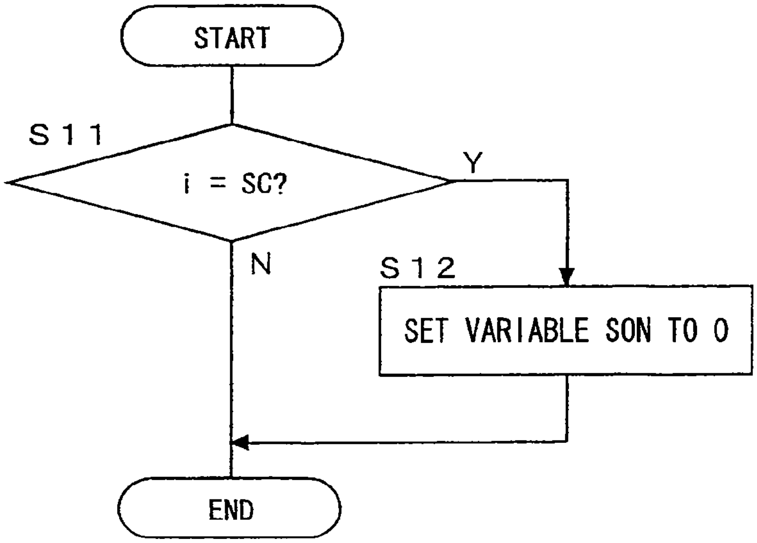
FIG. 8 is a similar flowchart showing processing corresponding to an OFF event of the selected switch of the channel strip corresponding to the i-th input channel.

The processing shown in FIG. 8 is processing corresponding to an OFF event of the selection switch 7*ic* of the channel strip corresponding to the i-th input channel.

In this processing, in Step S11, it is judged whether or not "i" is equal to the variable SC that has been set in Step S1 in FIG. 7, and when they are equal, SON is set to "0 (zero)" in Step S12, and when they are not equal, the processing is ended without further steps.

Since the number of the channel corresponding to the finally turned on selection switch 70*c* is set in SC at that point of time, this processing brings SON to "0" only when the finally pressed selection switch 70*c* is released.

Figure 9:
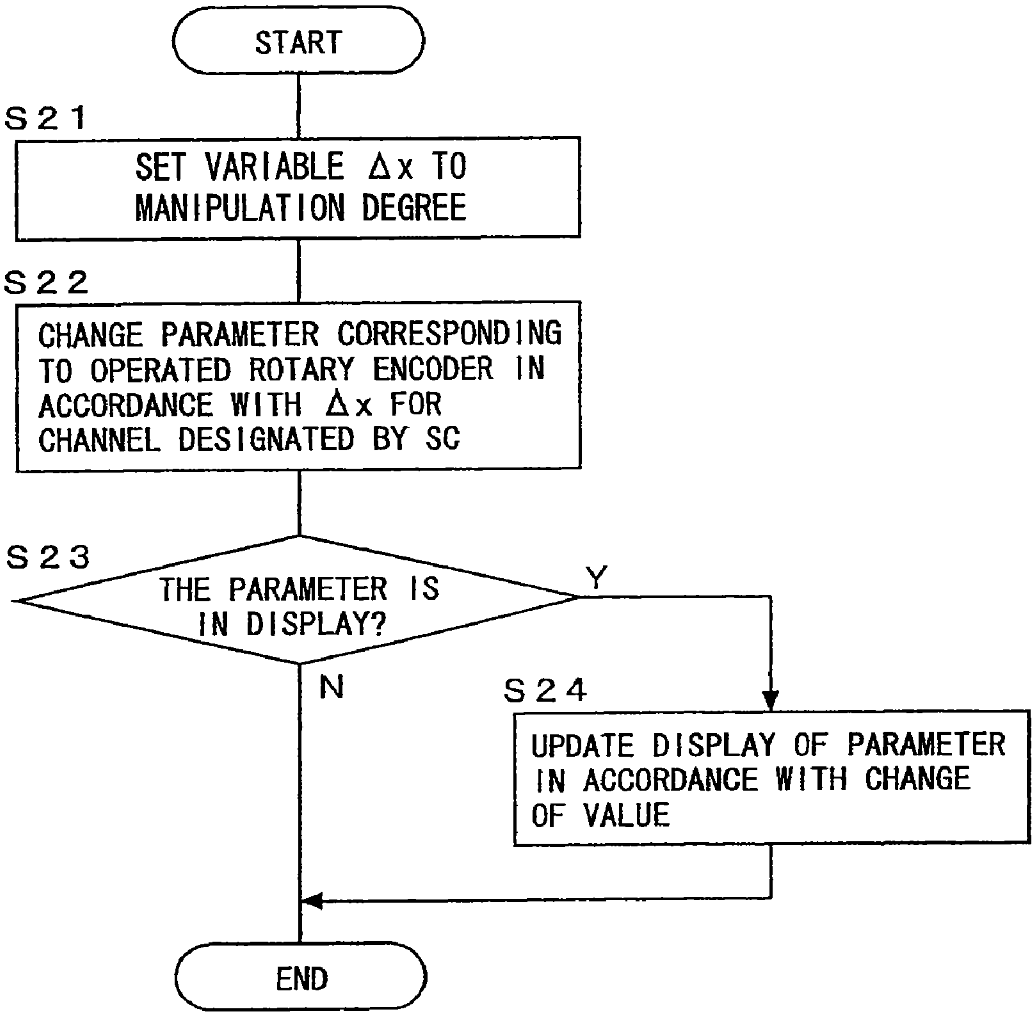
FIG. 9 is a similar flowchart showing processing corresponding to an operation event of a j-th control of a selection channel control switch group.

The processing shown in FIG. 9 is processing corresponding to an operation event of a j-th rotary encoder of the selected channel control switch group 80.

In this processing, the manipulation degree of a control is set first to a variable Δx in Step S21. Then, for the channel designated by the variable SC, that is, the channel corresponding to the finally turned-on selection switch 7*ic*, the parameter corresponding to the operated rotary encoder is changed in accordance with Δx in Step S22. Then, when the parameter is in display in Step S23, the display is updated in accordance with the change in Step S24, and when not in display, the processing is ended without further steps.

In short, this processing is processing relating to the function of the conventional selected channel control switch group 80.

Figure 10:
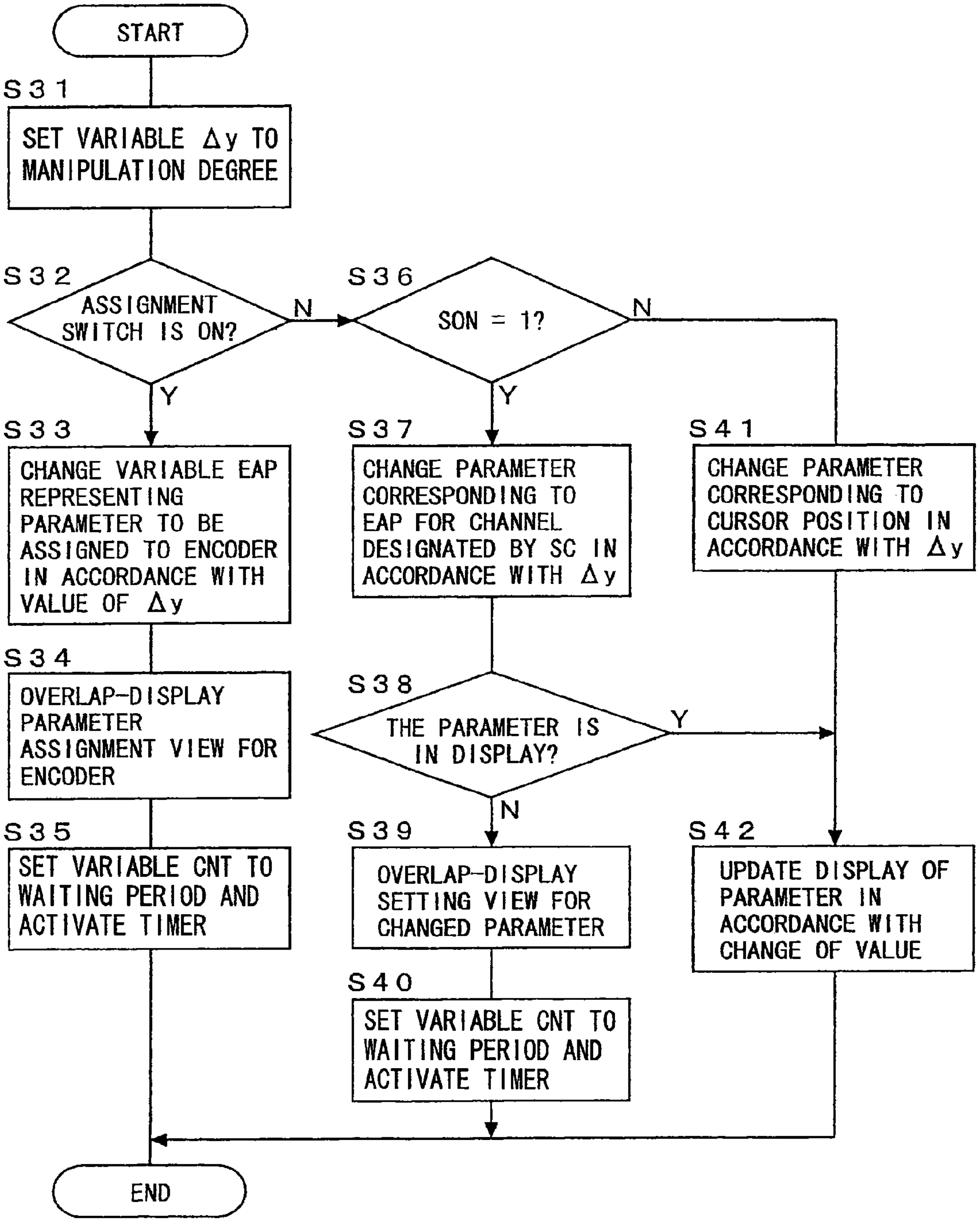
FIG. 10 is a similar flowchart showing processing corresponding to an operation event of increase/decrease controls.

The processing shown in FIG. 10 is processing corresponding to an operation event of the increase/decrease controls 50. In this case, both the case when a rotary encoder 51 is operated and the case when an increase switch 52 or a decrease switch 53 is operated are recognized as the same operation event. However, when the rotary encoder 51 is operated, the manipulation degree becomes positive or negative value according to the operation direction and has a magnitude according to the operation speed, when the increase switch 52 is operated, the manipulation degree becomes a predetermined positive value, and when the decrease switch 53 is operated, a predetermined negative value. It should be noted that the increase switch 52 and the decrease switch 53 have repeat functions of automatically repeating increase and decrease by being kept pressed, respectively.

In this processing, the manipulation degree of the increase/decrease controls 50 is first set to a variable Δy in Step S31. Then, when the assignment switch 90 is operated (when it is in an ON state) in Step S32, assignment processing of a parameter to the increase/decrease controls 50 is performed in Steps S33 to S35.

Specifically, a variable EAP representing the parameter to be assigned to the increase/decrease controls 50 is changed in accordance with the value of Δy, the parameter assignment view as shown in FIG. 6C is displayed in an overlapping manner, a predetermined waiting period is set to a variable CNT and a timer is activated, and then the processing is ended. In this processing, especially in Step S33, the CPU 115 functions as an assignor.

By this processing, the user can move the cursor on the parameter assignment view so as to select the parameter to be assigned to the increase/decrease controls 50 by operating the increase/decrease controls 50 while pressing the assignment switch 90. The alternatives of the parameter are not limited to those shown, and when the cursor reaches the end, the view is scrolled. Further, when the overlap display has been already performed in Step S34, it is only required to rewrite the overlap view. Further it is also adoptable not to perform the processing in Step S35 but to erase the parameter assignment view at the time of the assignment switch 90 being tuned off. Further, it is also adoptable to prepare the parameter assignment view as an independent view that is not an overlap view.

Alternatively, when the assignment switch 90 is not ON in Step S32, the flow proceeds to Step S36. Then, when the variable SON is "1" here, the parameter corresponding to the variable EAP for the channel that is designated by the variable SC is changed in accordance with Δy in Step S37.

Then, when the parameter is in display, the flow proceeds from Step S38 to Step S42 in which the display is updated in accordance with the change, and when it is not in display; the flow proceeds to Step S39 and thereafter in which a setting view for the changed parameter is overlap-displayed, a predetermined waiting period is set to the variable CNT and the timer is activated in Step S40, and the processing is ended. This view is, for example, one that is shown in FIG. 6A or FIG. 6B and displays the channel number, the kind of the parameter, and the setting contents. FIG. 6A shows three ON/OFF parameters, but only one of them can be assigned to the increase/decrease controls 50 at a time.

Alternatively, when SON is not "1" in Step S36, the flow proceeds to Step S41 and thereafter in which the parameter corresponding to the cursor position is changed in accordance with Δy, in accordance with which the display is updated.

The above-described processing is the most characteristic processing in the embodiment, and the CPU 115 functions as a parameter controller in Steps S36, S37, and S41. Further, the CPU 115 functions as a display controller in Steps S34 and S39.

Figure 11:
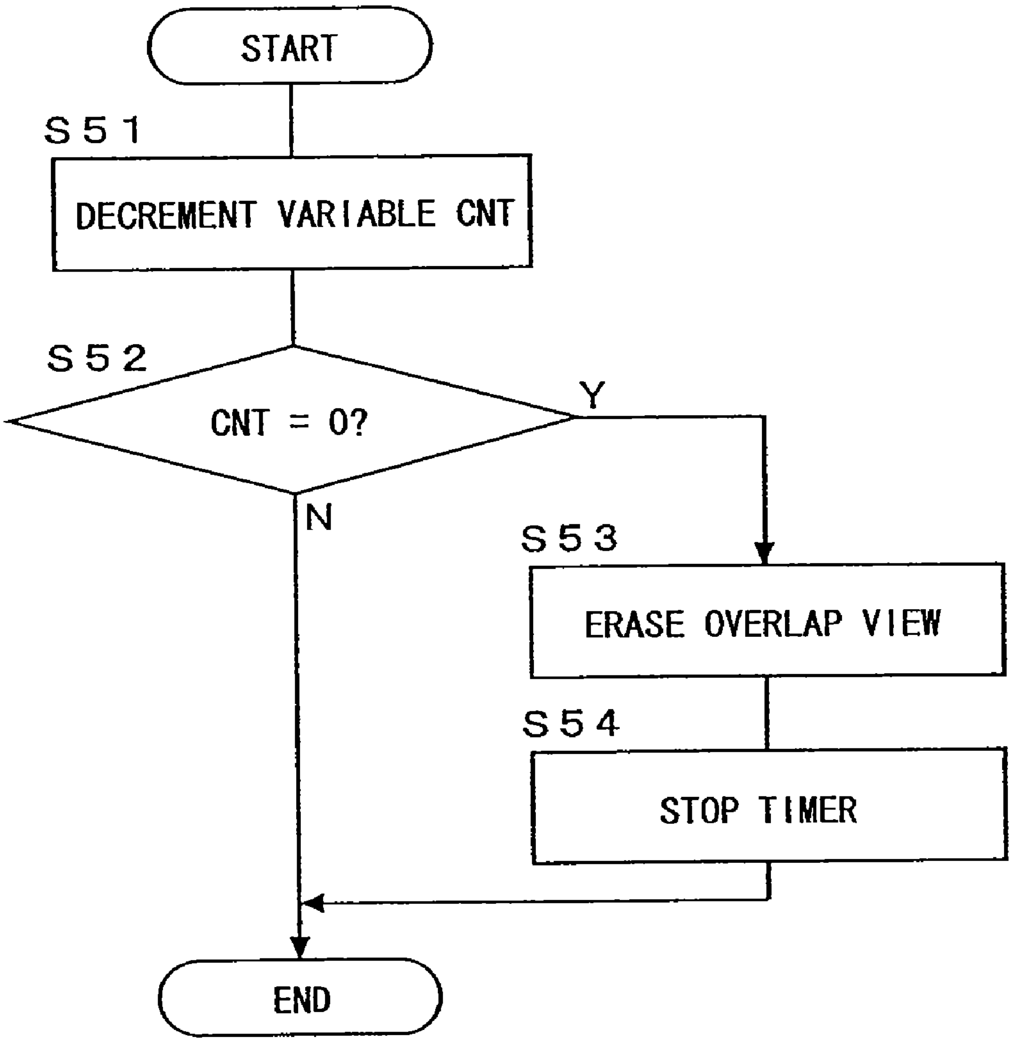
FIG. 11 is a similar flowchart showing processing executed at regular time intervals when a timer is activated.

The processing shown in FIG. 11 is interrupt processing relating to the timer, and processing performed at regular time intervals when the timer is activated.

In this processing, the variable CNT is decremented by 1 in Step S51, and when the CNT is 0 in Step S52, the overlap view displayed on the display portion of the display 10 is erased in Step S53 and the timer is stopped in Step S54. When it is not 0, the processing is ended without further steps.

By the above processing, the overlap view displayed in the processing shown in FIG. 10 can be erased after a lapse of the predetermined waiting period.

By performing the processing shown in the flowcharts in FIG. 7 to FIG. 11 in accordance with each event, a particular parameter can be assigned to the increase/decrease controls 50 that have been conventionally provided as controls for increasing/decreasing the parameter corresponding to the cursor position, so that only when the increase/decrease controls 50 are operated concurrently with the selection switch 7*ic*, the increase/decrease controls 50 can be used as controls for editing an assigned parameter of a channel corresponding to the operated selection switch 7*ic*. Further, this assignment can also be performed by concurrently operating both the assignment switch 90 and the increase/decrease controls 50. Accordingly, only one assignment switch 90 is newly provided, whereby an arbitrary parameter can be edited by increase/decrease controls 50 without selection by the cursor every time, so that the operability of the digital mixer can be greatly improved with little or no increase in cost.

As has been described, according to the digital mixer of the invention, the operability of the digital mixer can be greatly improved with little or no increase in cost.

What is claimed is:

1. A digital mixer including a display, a plurality of cursor controls, an increase/decrease control, and a plurality of channel strips for controlling parameters, including an input signal level, of each of a plurality of input channels associated therewith, on a control panel, said channel strips each having a level setting control and a selection switch, said digital mixer comprising:

a view selector for selecting one of a plurality of parameter views and displaying the selected parameter view on said display, said parameter views each corresponding to one of the parameters and showing a corresponding parameter for each of the plurality of input channels;

a cursor controller for detecting a user operation of at least one of said plurality of cursor controls and positioning a cursor at one of the parameters shown in the selected parameter view;

a level controller for detecting a user operation of said level setting control of one of said channel strips and controlling said input signal level for an input channel corresponding to the channel strip in accordance with the operation of said level setting control;

a channel selector for detecting a user operation of said selection switch of one of said channel strips and positioning, in the selected parameter view, the cursor at one parameter for an input channel corresponding to the channel strip among the parameters for plural input channels;

an assignor for selecting a parameter among the parameters of the input channel to be assigned to said increase/decrease control; and a parameter controller for detecting a user operation of said increase/decrease control, judging whether or not said selection switch of any one of said channel strips is operated at the same time while the operation of said increase/decrease control is detected, and when judging that no selection switch is operated at the same time, changing a value of the parameter corresponding to position of the cursor in the selected parameter view, in accordance with the operation of said increase/decrease control, and, when judging that said selection switch of a channel strip is being operated at the same time, changing a value of the parameter selected by said assignor among said parameters of an input channel corresponding to the channel strip in accordance with the operation of said increase/decrease control.

2. A digital mixer according to claim 1, wherein said increase/decrease control is a rotary encoder and/or a combination of an increase switch and a decrease switch.

3. A digital mixer according to claim 1, further comprising:

a display controller that, when the value of the parameter selected by said assignor is changed by the parameter controller, updates the parameter shown in the selected parameter view if the parameter is shown in the selected parameter view which is displayed on said display.

4. A digital mixer according to claim 3, wherein when the value of the parameter selected by the assignor is changed by said parameter controller, said display controller displays an overlap view showing the value of the parameter over the selected parameter view displayed on said display, if the parameter is not shown in the selected parameter view.

5. A digital mixer according to claim 4, wherein said display controller displays the overlap view over the selected parameter view for a predetermined period and then erases the overlap view from the view.

6. A digital mixer according to claim 1, further comprising a plurality of view selection controls each of which corresponds to one of said parameter views, wherein said view selector detects an operation on one of the plurality of the view selection controls, selects a parameter view corresponding to the operated view selection control, and displays the selected parameter view on said display.

7. A digital mixer according to claim 1, further comprising an assignment control, wherein when the operation of said increase/decrease control is detected, if said assignment control is being operated at the same time, said parameter controller does not change a value of any parameter, and said assignor selects one of said parameters in accordance with the operation of said increase/decrease control.

8. A digital mixer according to claim 7, wherein when the assignor selects any one parameter in accordance with the operation of said increase/decrease control, a display controller displays an overlap view showing the selected parameter over the parameter view on the view displayed on said display.

* * * * *